3,290,345
SULFONYL CYCLOPENTADIENYL MANGANESE TRICARBONYLS

John Kozikowski, Walled Lake, Mich., and Michael Cais, Haifa, Israel, assignors to Ethyl Corporation, New York, N.Y., a corporation of Virginia
No Drawing. Original application Aug. 12, 1960, Ser. No. 49,135. Divided and this application May 29, 1963, Ser. No. 299,440
3 Claims. (Cl. 260—429)

This application is a division of application Serial No. 49,135, filed August 12, 1960, now abandoned. This invention relates to a variety of organometallic compounds and the processes employed in their production. More specifically, this invention relates to compounds and processes involving the use of a cyclopentadienyl sulfonic acid manganese tricarbonyl compound.

An object of our invention is to provide new organometallic compounds and processes for their preparation. A further object is to provide cyclopentadienyl manganese tricarbonyl derivatives and processes for their preparation. Additional objects will become apparent from a reading of the specification and claims which follow.

The objects of this invention are accomplished by preparing a wide variety of cyclopentadienyl manganese tricarbonyl sulfone compounds. These compounds are formed by reacting a cyclopentadienyl sulfinic acid manganese tricarbonyl with an alkali metal hydroxide or an alkali metal salt of an acid which is weaker than the cyclopentadienyl sulfinic acid manganese tricarbonyl reactant. As a result, there is formed a salt having the formula

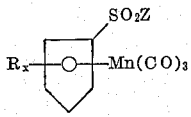

in which R is a univalent hydrocarbon group containing from one to eight carbon atoms, $x$ is an integer ranging from zero to three, and Z is an alkali metal. The intermediate salt is then reacted with an alkyl halide or an aralkyl halide which may be substituted or unsubstituted. This process is illustrated by way of the following reaction:

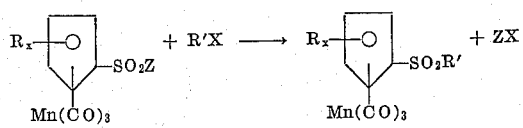

In the above reaction, R' is an alkyl or aralkyl group, and $x$ is a halogen. The reaction conditions employed are not critical and the alkyl or aralkyl halide, when used in sufficient excess, may itself serve as the solvent. The preparation of cyclopentadienyl sulfinic acid manganese tricarbonyls, the starting materials in this invention, and the preparation of other related compounds is fully described in our copending application Serial No. 283,139, filed May 13, 1963, now U.S. Patent No. 3,205,245. To further illustrate this form of our invention, there is presented the following general example and tables which summarize the results obtained from several such reactions.

Example I

The sodium salt derivative of cyclopentadienyl sulfinic acid manganese tricarbonyl was dissolved in ethanol and refluxed with a slight excess of the alkyl or aralkyl halide. The cooled mixture was filtered to remove the sodium halide which formed, and the ethanolic filtrate was concentrated by heating until crystals began to appear. After cooling, the crystals were collected and were generally of a high degree of purity. An additional crop of crystals could be obtained by diluting the ethanolic mother liquor with water.

Following the general procedure set forth in the preceding example, the results were obtained as set forth in the following Table I. The analyses obtained for the compounds of Table I are set forth in Table II.

TABLE I

| R'—X | Reflux Time, hrs. | Compound Obtained | Yield, Percent | M.P. ° C. | Recrystn. Solvent |
|---|---|---|---|---|---|
| CH₃I | 2 | [(Methylsulfonyl)cyclopentadienyl] manganese tricarbonyl. | 97 | 156–158 | B.[1] |
| ClCH₂[(CH₃)₃C]₂C₅H₂OH [2] | 20 | [(3,5-di-tert-butyl-4-hydroxybenzylsulfonyl) cyclopentadienyl] manganese tricarbonyl. | 84 | 170–171 | E.[1] |
| CH₃COCH₂Cl [3] | 2 | [(Acetonylsulfonyl)cyclopentadienyl] manganese tricarbonyl. | 75 | 123–124 | B. |
| BrCH₂COC₅H₄Mn(CO)₃ [4] | 3 | {[[(Tricarbonylmanganese)cyclopentadienyl] carbonyl methylsulfonyl} cyclopentadienyl} manganese tricarbonyl. | 94 | 167–168 | E/B. |

[1] B, benzene; E, ethanol.
[2] 3,5-di-tert-butyl-4-hydroxybenzylchloride.
[3] The 2,4-dinitrophenylhydrazone of [(p-methoxyphenylsulfonyl)cyclopentadienyl] manganese tricarbonyl formed very readily, M.P. 190–191° (from chloroform/methanol). Analysis, Calcd. for C₁₇H₁₃MnN₄O₉S: C, 40.4; H, 2.57; Mn, 10.9. Found: C, 40.5; H, 2.60; Mn, 10.9.
[4] (Bromoacetylcyclopentadienyl) manganese tricarbonyl.

TABLE II

| Compounds | Carbon Calcd. | Percent Found | Hydrogen Calcd. | Percent Found | Manganese Calcd. | Percent Found | Sulfur Calcd. | Percent Found |
|---|---|---|---|---|---|---|---|---|
| [(Methylsulfonyl)cyclopentadienyl] manganese tricarbonyl | 38.3 | 37.9 | 2.50 | 2.42 | 19.4 | 19.4 | 11.3 | 11.6 |
| [(3,5-di-tert-butyl-4-hydroxybenzylsulfonyl) cyclopentadienyl] manganese tricarbonyl | 56.8 | 56.8 | 5.63 | 5.66 | 11.3 | 11.3 | 6.6 | 6.6 |
| [(Acetonylsulfonyl)cyclopentadienyl] manganese tricarbonyl | | | | | 16.9 | 16.9 | | |
| {[[(Tricarbonylmanganese)cyclopentadienyl] carbonyl methylsulfonyl} cyclopentadienyl} manganese tricarbonyl | 42.1 | 42.2 | 1.95 | 2.19 | 21.4 | 21.5 | 6.28 | 6.24 |

Bromoacetylcyclopentadienyl manganese tricarbonyl, which was employed as a reactant, as reported in Table I, was prepared by reacting an acylcyclopentadienyl manganese tricarbonyl compound having the formula

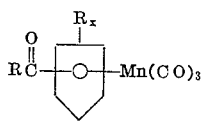

in which R is an univalent hydrocarbon radical containing from one to about eight carbon atoms and $x$ is an integer ranging from zero to three, with a halogenating agent. In the specific case of the bromoacetyl compound, the halogenating agent was bromine. Analogous compounds such as the chloroacetylcyclopentadienyl manganese tricarbonyl and iodoacetylcyclopentadienyl manganese tricarbonyl compounds are prepared by reaction of chlorine or iodine with an acetylcyclopentadienyl manganese tricarbonyl compound. The reaction can be conducted in any inert solvent, although preferably, the solvent is polar and most preferably, it is an ether. The reaction is conducted at low temperatures in the order of about 0° C. To illustrate the reaction, there is presented the following example.

*Example II*

To a solution comprising 24.6 grams of acetylcyclopentadienyl manganese tricarbonyl in 250 ml. of ether cooled to 0° C. was added 16.0 grams of bromine. The bromine was added dropwise with stirring over a one-half hour period. Stirring was continued for an additional one-half hour after which the ether and hydrogen bromide were removed by distillation of the reaction mixture at reduced pressure. The yellow-orange compound (bromoacetylcyclopentadienyl manganese tricarbonyl) which remained was recrystallized from ether and was found to be soluble in organic solvents. The yield was 27 grams of bromoacetylcyclopentadienyl manganese tricarbonyl or 83 percent of theory. The compound had a melting point of 75–77° C. and on analysis there was found: C, 37.1; H, 1.93; Mn, 17.0; Br, 24.8 percent. Calculated for $C_{10}H_6MnO_4Br$: C, 36.9; H, 1.85; Mn, 16.9; Br, 24 percent.

Among the important uses of our compounds is their use as fuel and oil additives. For example, they are useful antiknocks when added to gasoline. They may be used as primary antiknocks in which they are the major antiknock component in the fuel or as supplemental antiknocks. When used as supplemental antiknocks, they are present as the minor antiknock component in the fuel in addition to a primary antiknock such as a tetraalkyllead compound. Typical alkyllead compounds are tetraethyllead, tetrabutyllead, tetramethyllead and various mixed lead alkyls such as dimethyldiethyllead, diethyldibutyllead and the like. When used as either a supplemental or primary antiknock, our compounds may be present in the gasoline in combination with typical scavengers such as ethylene dichloride, ethylene dibromide, tricresylphosphate, trimethylphosphate and the like.

The compounds of our invention have further utility as additives to residual and distillate fuels generally, e.g., jet fuels, home heater fuels and diesel fuels, to reduce smoke and/or soot formation. Also, they may be employed as additives to lubricating oils in which case they act to improve the lubricity at the base oil.

Our compounds are further useful in many metal plating applications. In order to effect metal plating using the compounds, they are decomposed in an evacuated space containing the object to be plated. On decomposition, they lay down a film of metal on the object. The gaseous plating may be carried out in the presence of an inert gas so as to prevent oxidation of the plating metal or the object to be plated during the plating operations.

The gaseous plating technique described above finds wide application in forming coatings which are not only decorative but also protect the underlying substrate material.

Deposition of metal on a glass cloth illustrates the applied process. A glass cloth band weighing one gram is dried for one hour in an oven at 150° C. It is then placed in a tube which is devoid of air and there is added to the tube 0.5 gram of [(methylsulfonyl)cyclopentadienyl] manganese tricarbonyl. The tube is heated at 400° C. for one hour after which time it is cooled and opened. The cloth has a uniform metallic grey appearance and exhibits a gain in weight of about 0.02 gram.

A further utility for our compounds is as drying agents in which case the compounds are incorporated in paints, varnish, printing inks, synthetic resins of the drying oil type, oil enamels and the like. A still further utility for our compounds is their use as chemical intermediates in the preparation of metal-containing polymeric materials or in the preparation of new organic materials.

Having fully defined the novel compounds of our invention, their mode of preparation and their many utilities, we desire to be limited only within the lawful scope of the appended claims.

We claim:
1. Compounds having the formula:

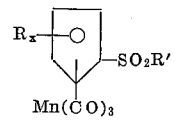

wherein R is a univalent hydrocarbon group containing from one to about 8 carbon atoms, $x$ is an integer ranging from 0 to 3 and R' is selected from the group consisting of alkyl and aralkyl groups.

2. [(Methylsulfonyl)cyclopentadienyl]manganese tricarbonyl.

3. [(3,5 - di-tert-butyl-4-hydroxybenzylsulfonyl)cyclopentadienyl]manganese tricarbonyl.

References Cited by the Examiner

UNITED STATES PATENTS 3,028,406   4/1962   Brantley _____ 260—429

OTHER REFERENCES

Cais et al.: Chemistry and Industry, page 202 (Feb. 20, 1960).

Karrer, P.: Organic Chemistry, 2nd English edition, Elsevier Publishing Co., New York, N.Y. (1946), page 118.

Kozikowski et al.: Jour. Am. Chem. Soc., volume 81, (1959) pages 2995–7.

Perevalova et al.: Doklady Akad. Nauk S.S.S.U. 132, 853–6 (1960).

TOBIAS E. LEVOW, *Primary Examiner.*

T. L. IAPALUCCI, A. DEMERS, *Assistant Examiners.*